US006971141B1

(12) United States Patent
Tak

(10) Patent No.: US 6,971,141 B1
(45) Date of Patent: Dec. 6, 2005

(54) SURFACE-TRAVELING MOBILE APPARATUS AND CLEANING APPARATUS USING THE SAME

(75) Inventor: Seung-Ho Tak, Seoul (KR)

(73) Assignee: SHT Co., Ltd., Seoul (KR)

( * ) Notice: Subject to any disclaimer, the term of this patent is extended or adjusted under 35 U.S.C. 154(b) by 467 days.

(21) Appl. No.: 10/009,336

(22) PCT Filed: Jun. 1, 2000

(86) PCT No.: PCT/KR00/00571

§ 371 (c)(1),
(2), (4) Date: Mar. 14, 2002

(87) PCT Pub. No.: WO00/75000

PCT Pub. Date: Dec. 14, 2000

(30) Foreign Application Priority Data

Jun. 7, 1999 (KR) ................................ 1999-20978

(51) Int. Cl.[7] .............................................. B08B 5/04
(52) U.S. Cl. ...................... 15/340.1; 15/49.1; 15/302; 15/319; 15/340.4
(58) Field of Search ................. 15/302, 319, 340.1, 15/340.2, 340.3, 340.4, 49.1, 50.1; 134/21; 180/901, 164

(56) References Cited

U.S. PATENT DOCUMENTS

| 1,581,849 A | 4/1926 | Madsen |
| 3,991,842 A | 11/1976 | Larsen |
| 6,090,221 A * | 7/2000 | Gan et al. ..................... 134/21 |

FOREIGN PATENT DOCUMENTS

| JP | 61-46778 1 | 7/1986 |
| JP | 4-104786 | 9/1992 |
| JP | 5-49554 | 2/1993 |
| WO | WO85 02135 | 5/1985 |

* cited by examiner

*Primary Examiner*—John Kim
*Assistant Examiner*—Abraham Bahta
(74) *Attorney, Agent, or Firm*—Lowe Hauptman & Berner, LLP

(57) ABSTRACT

A surface traveling mobile apparatus which moves by an endless track belt installed to be wrapped around a case from end to end, traveling on a surface by the rotation of wheels driven by a power source is provided. The surface traveling mobile apparatus includes vacuum chambers installed to be attached to the sides of the wheels, a vacuum tube for connecting the vacuum chambers to each other, a vacuum pump formed in part of the vacuum tube, the vacuum pump for inhaling and exhausting air, and suction mechanisms installed along the endless track belt at predetermined intervals, valve driven by contacting the wheels, and vacuum attached to the surface by the vacuum pump inhaling and exhausting air. Also, a cleaning apparatus including a spray unit for spraying water or wash liquid to the surface when the surface traveling mobile apparatus moves, and a rotating brush for washing the surface using the sprayed liquid, are provided. Accordingly, the surface traveling apparatus and the cleaning apparatus using the same can freely travel a plane, an inclined plane, a vertical plane, and a ceiling and thus, can clean areas which are not easily cleaned by people, such as windows or high buildings and high ceilings.

15 Claims, 21 Drawing Sheets

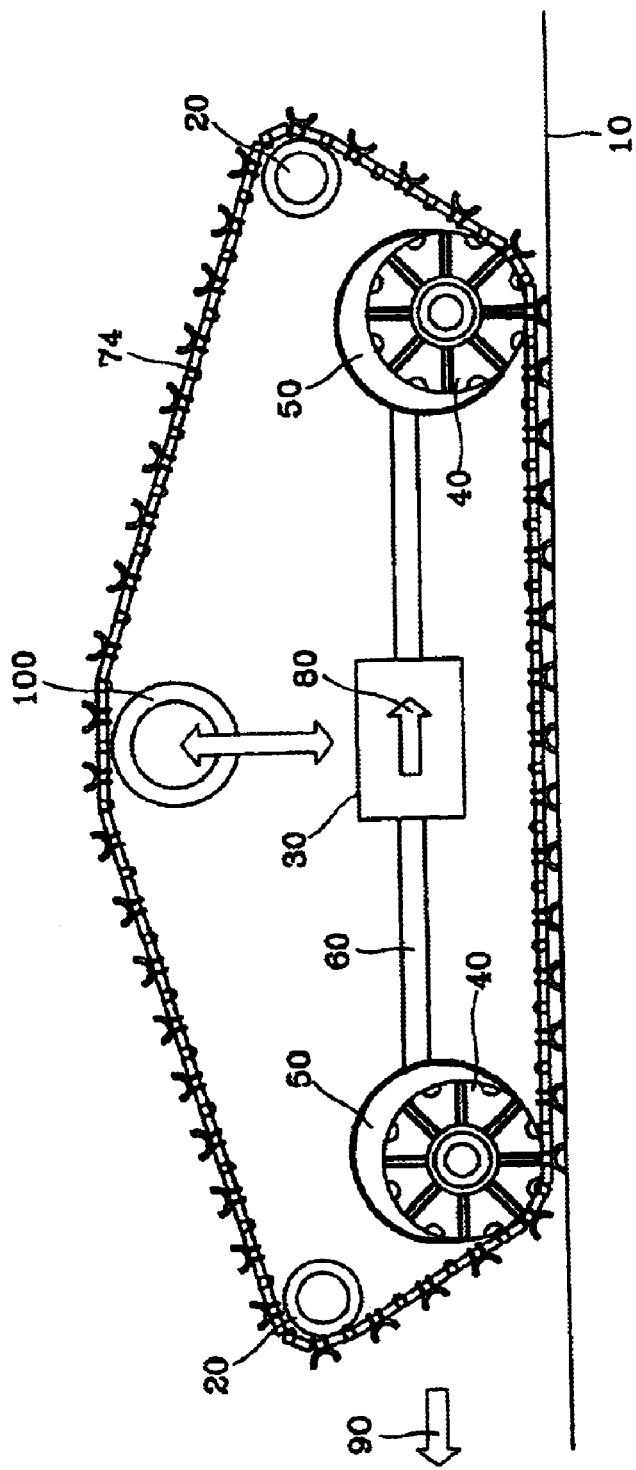

SURFACE-TRAVELING MOBILE APPARATUS AND CLEANING APPARATUS USING THE SAME

TECHNICAL FIELD

The present invention relates to a surface traveling mobile apparatus and a cleaning apparatus using the same, and more particularly, to a surface traveling mobile apparatus which travels on a flat plane such as a floor, an inclined plane such as a ramp, a vertical plane such as a window or a marble wall, travels upside down on a flat plane such as a ceiling, and can travel over rough surfaces and obstacles, and a cleaning apparatus using the same.

BACKGROUND ART

Conventional surface traveling mobile apparatuses such as cars, which constitute a load due to their weight, can be moved by drivers by means of wheels or endless track belts only within a range of angles achieved by a certain amount of climbing capability. In order to move surface traveling mobile apparatuses at steep angles against gravity, additional propellers similar to those attached to rockets or additional ascending and descending units and supporters are necessary.

Also, conventionally, walls and windows are cleaned by people who work at high places, which involves difficulties. The walls and windows can be cleaned by robots. However, robots have not been commonly used since they are expensive. Therefore, cleaning apparatuses for automatically cleaning floors or windows using surface traveling mobile apparatuses which can freely travel on an inclined plane, a vertical plane, and a ceiling are necessary.

DISCLOSURE OF THE INVENTION

It is an object of the present invention to provide a surface traveling mobile apparatus which can freely travel on a plane, an inclined plane, a vertical plane, and a ceiling.

It is another object of the present invention to provide a surface traveling mobile apparatus including a supplementary device for letting the surface traveling mobile apparatus travel over an obstacle and on a rugged surface.

It is another object of the present invention to provide a cleaning apparatus including the surface traveling mobile apparatus equipped with a sprayer for spraying water or wash liquid on a surface to be cleaned or a rotating brush for wiping a surface to be cleaned using sprayed liquid.

It is another object of the present invention to provide a surface traveling mobile apparatus equipped with a sensor for sensing a limit load display code of a vertical wall and a ceiling.

Accordingly, to achieve the above objects, there is provided a surface traveling mobile apparatus which moves by an endless track belt installed to be wrapped around a case from end to end traveling on a surface by the rotation of wheels driven by a power source, the surface traveling mobile apparatus comprising vacuum chambers installed to be attached to the sides of the wheels, a vacuum tube for connecting the vacuum chambers to each other, a vacuum pump formed in part of the vacuum tube, the vacuum pump for inhaling and exhausting air, and suction mechanisms installed along the endless track belt at predetermined intervals, valve driven by contacting the wheels, and vacuum attached to the surface by the vacuum pump inhaling and exhausting air.

There is provided a cleaning apparatus for automatically cleaning a surface by being moved by a surface traveling mobile apparatus which moves by an endless track belt installed to be wrapped around a case from end to end traveling on the surface by the rotation of wheels driven by a power source, the cleaning apparatus comprising vacuum chambers installed to be attached and sealed to the sides of the wheels, a vacuum tube for connecting the vacuum chambers to each other, a vacuum pump formed in part of the vacuum tube, the vacuum pump for pumping air, suction mechanisms installed along the endless track belt at predetermined intervals, valve driven by contacting the wheels, and vacuum attached to the surface by the action of the vacuum pump, a spray means for spraying water or wash liquid on a surface when the surface traveling mobile apparatus moves, and a rotating brush for washing the surface using the sprayed liquid.

The vacuum pump preferably comprises a motor for generating rotatory force, a rotating magnet, in which the N pole and the S pole are alternately arranged and which is rotated by the rotatory force of the motor, the rotating magnet for generating different magnetic fields, a fixed magnet arranged to be opposite to the rotating magnet, a pump having a diaphragm operating by the attraction and repulsion between the rotating magnet and the fixed magnet, a vacuum chamber, the air inside of which is pumped due to the movement of the diaphragm, and directional valves installed in openings at both ends of the vacuum chamber, the one directional valves for permitting the pumped air to flow in one direction.

Each of the suction mechanism preferably comprises a hollow valve case formed to be integrated with the endless track belt, a valve driver coming in and coming out from at least part of the valve case by contacting the wheels, a lever operated by the valve driver coming in and coming out from the valve case, a ball moving up and down in the hollow portion of the valve case by the operation of the lever, a spring installed to contact the upper portion of the ball in the hollow portion, the spring for providing an elastic bias, and a flexible body formed to be integrated with the lower portion of the valve case and vacuum attached to or detached from a surface by evacuating the air therein or supplying air thereinto through a lower O ring opening of the valve case due to the operation of the ball valve.

Each of the suction mechanism preferably further comprises a separation preventing groove so that the valve driver in the valve case is not separated from the valve case.

The cleaning apparatus preferably further comprises an articulated apparatus having a boom, which can be telescopically extended and retracted, and a suction mechanism for being vacuum attached to and detached from a surface, which is formed in the suction mechanism at the end of a boom in the articulated apparatus, so that the surface traveling mobile apparatus safely travels on a rugged surface or over an obstacle.

The cleaning apparatus preferably further comprises a belt tension controlling apparatus for controlling the tension of the endless track belt in part of the surface traveling mobile apparatus so that the surface traveling mobile apparatus safely travels a rugged surface or over an obstacle.

Each of the wheels preferably comprises grooves for preventing the wheel from being separated from the endless track belt when the wheel contacts the endless track belt and an opening for letting air flow between the wheel and the suction mechanism to the vacuum chamber.

BRIEF DESCRIPTION OF THE DRAWINGS

The above objects and advantages of the present invention will become more apparent by describing in detail a preferred embodiment thereof with reference to the attached drawings in which:

FIG. 8 is a side view schematically showing a surface traveling mobile apparatus according to another embodiment of the present invention, in which the surface traveling mobile apparatus further includes units for controlling the tension of a belt when the surface traveling mobile apparatus travels on a rugged surface and over an obstacle;

BEST MODE FOR CARRYING OUT THE INVENTION

Figure 1:
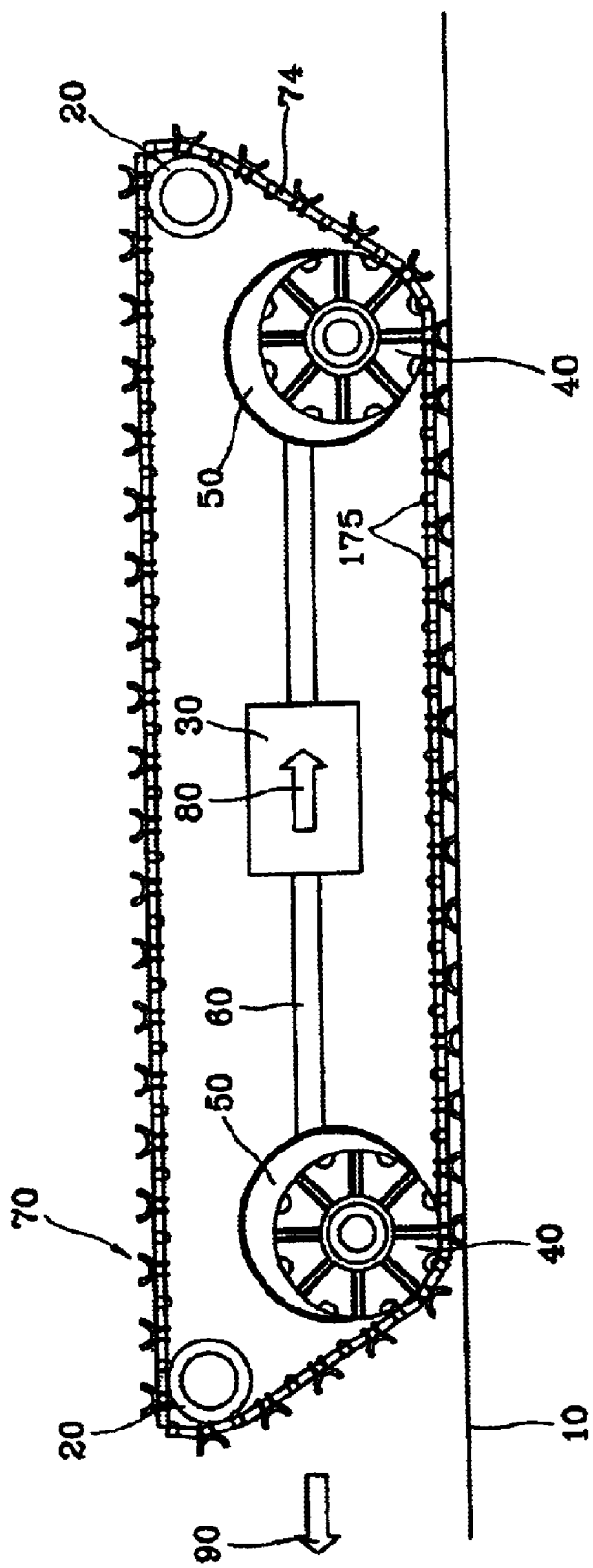
FIG. 1 is a side sectional view schematically showing a surface traveling mobile apparatus according to a preferred embodiment of the present invention.

Hereinafter, preferred embodiments of a surface traveling mobile apparatus according to the present invention and a cleaning apparatus using the same will be described in more detail with reference to the attached drawings. The same reference numerals appearing in different drawings represent the same element.

FIG. 1 is a side view of a surface traveling mobile apparatus according to an embodiment of the present invention. The power transmission structure and the case structure of the surface traveling mobile apparatus are not shown in FIG. 1, since they are not directly related to the present invention. Only wheels, a track belt, a vacuum pump, and suction mechanisms are schematically shown. FIG. 1 shows the surface traveling mobile apparatus which moves by an endless track belt 74 installed to be wrapped around the case (not shown) from end to end, traveling on a surface 10 due to the rotation of wheels 40, similar to military tanks and armored motorcars. The surface traveling mobile apparatus of FIG. 1 includes vacuum chambers 50 installed to be attached to the sides of the wheels 40, a vacuum tube 60 for connecting the vacuum chambers 50 to each other, a vacuum pump 30 formed in part of the vacuum tube 60, for inhaling air and then, exhausting air, and suction mechanisms 70 which are installed at predetermined intervals along the endless track belt, are valve driven by contacting the wheels 40, and are vacuum attached to the surface 10 due to the inhaling and exhausting of air by the vacuum pump 30. Also, the surface traveling mobile apparatus according to the present invention includes supporting rollers 20 in the corners of the endless track belt 74, for smoothly rotating and supporting the endless track belt 74. The supporting rollers 20 maintain the angle formed by belt contact surfaces.

Figure 2:
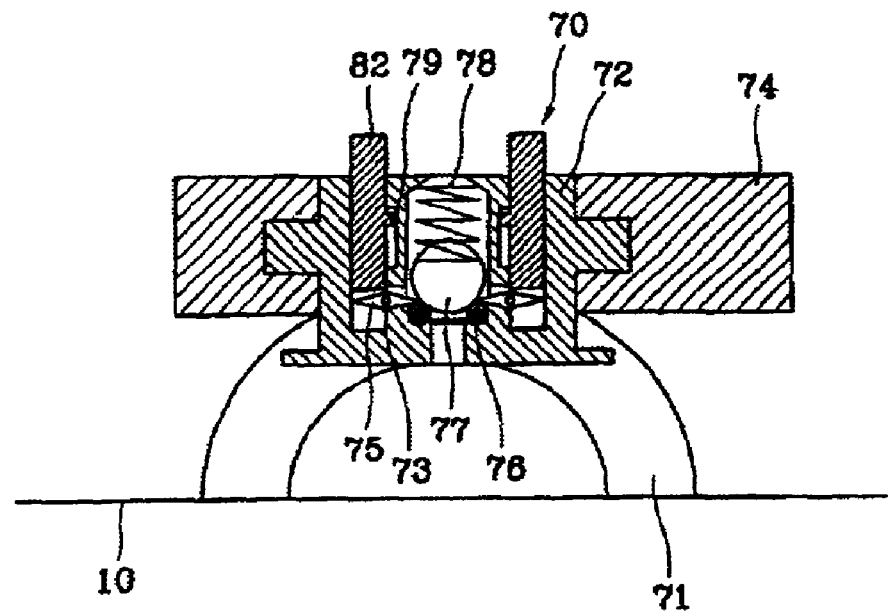
FIG. 2 is a side sectional view showing the closed state of a ball valve in a suction mechanism adopted in FIG. 1 which includes a flexible body and a ball valve structure suction unit.
Figure 3:
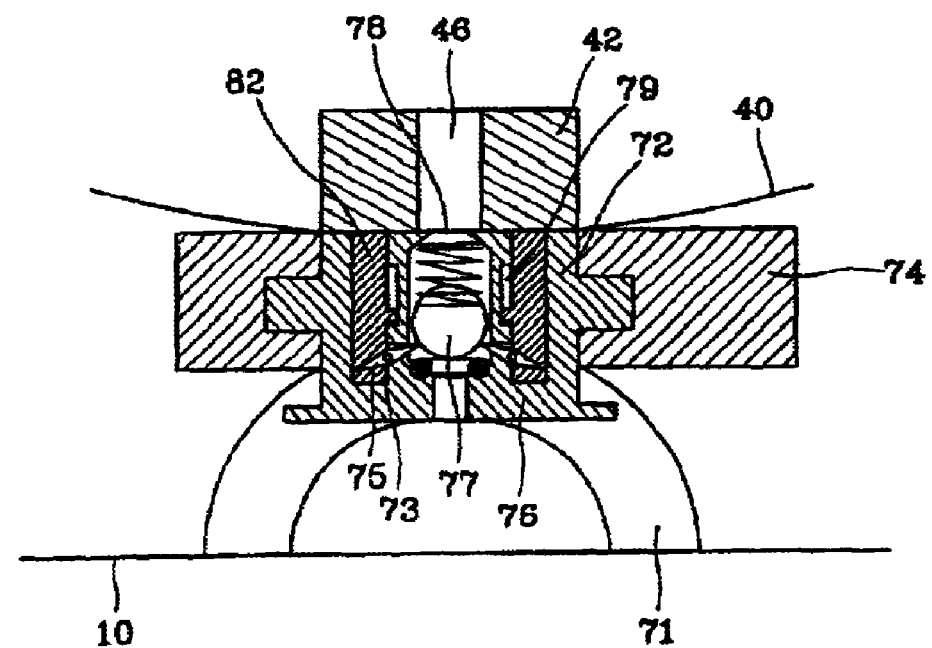
FIG. 3 is a side sectional view showing the opened state of the ball valve of FIG. 2.

FIG. 2 is a side sectional view showing the closed state of a ball valve in a suction mechanism adopted in FIG. 1, which includes a flexible body and a ball valve structure suction unit. FIG. 3 is a side sectional view showing the opened state of the ball valve of FIG. 2. As shown in FIGS. 1 through 3, when the body 42 of the wheel 40 presses valve drivers 82, the valve drivers operate levers 75, thus lifting a ball 77 supported by the levers 75. Accordingly, a spring 78 is compressed. A hemispherical flexible body 71, which is formed of rubber or silicon and whose inside is empty, is vacuum attached to the surface 10 since the air is exhausted from the hemispherical space inside through the openings of O rings 76 and a crack between the lifted ball 77 and the lever 75. Here, the levers 75 are fixed to a valve case 72 by fixers 73. The valve case 72 is formed to be integrated with the endless track belt along the endless track belt. At this time, valve drivers 82 move in a state in which the protrusions of the valve drivers 82 are confined to separation preventing grooves 79 formed in the valve case 72 so that the valve drivers 82 are not separated from the valve case 72. Therefore, as shown in FIG. 2, the air is exhausted from the suction mechanism 70 which does not contact the wheel since the ball valve is kept closed. Accordingly, the flexible body 71 is maintained in the state of being vacuum attached to the surface. As shown in FIG. 3, the air is sucked into the suction mechanism 70 which contacts the wheel since the ball valve is kept opened. Accordingly, the flexible body is detached from the surface. At this time, as shown in FIG. 1, the vacuum pump 30 installed in the middle of the vacuum tube 60 for connecting the wheels 40 to each other, sucks in air from the flexible body of the suction mechanism shown in FIG. 3 and exhausts the air to the vacuum attached flexible body shown in FIG. 2, thus detaching the flexible body from the surface. The vacuum pump 30 sucks in air from the flexible body 71 or supplies air to the flexible body 71 through the vacuum chambers 50 attached to the sides of the wheels 40 and the vacuum tube 60. As shown in FIG. 1, when the wheels contact the flexible body 71 due to the rotation of the endless track belt, the vacuum pump 30 inhales the air from the contacted flexible body 71 in an arrow direction 80, thus vacuum attaching the flexible body 71 to the surface and exhausts air to the flexible body 71 on the other side, thus detaching the flexible body from the surface. Accordingly, the surface traveling mobile apparatus moves in an arrow direction 90.

Figure 4A:
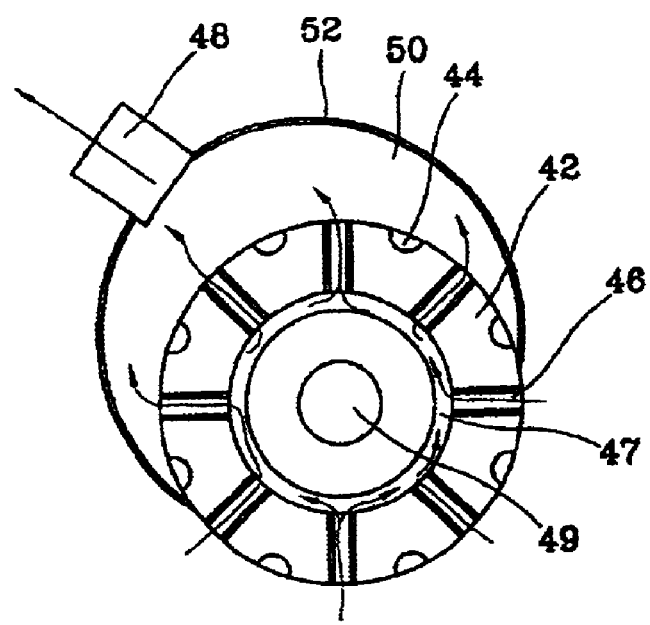
FIG. 4A is a side sectional view showing wheels and a vacuum chamber which are adopted in FIG. 1.
Figure 4B:
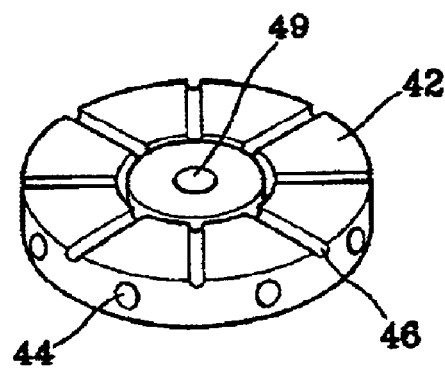
FIG. 4B is a perspective view showing a single wheel unit.
Figure 4C:
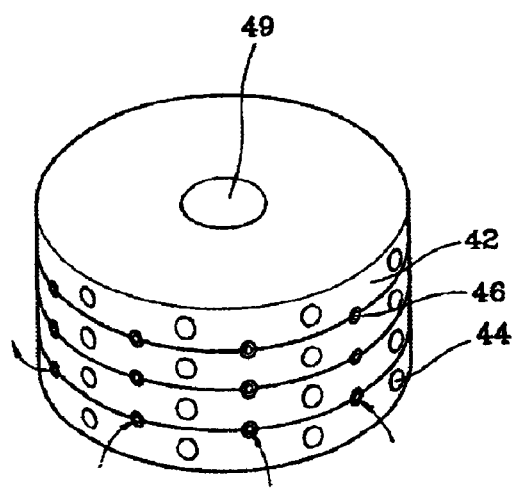
FIG. 4C is a perspective view showing an entire wheel having four single wheel units.

The structure of the wheel 40 which rotates, while being engaged with the endless track belt 74 is shown in FIGS. 4A through 4C. FIG. 4A is a side sectional view showing the wheel and the vacuum chamber which are adopted in FIG. 1. FIG. 4B is a perspective view showing a single unit wheel. FIG. 4C is a perspective view showing the entire wheel consisting of four single unit wheels. As shown in FIGS. 4A through 4C, in the structure of the wheel 40 applied to the present invention, grooves 44 for preventing the wheel 40 from sliding on the endless track belt 74, by being engaged with protrusions 175 (of FIG. 1) of the endless track belt 74, are provided on the surface of a cylinder. In the cylindrical wheel 40, a plurality of, preferably eight, semicircular grooves 46 are formed from the circumference of the wheel 40 to the center of the wheel 40. Accordingly, the air sucked in from the inside of the flexible body is transmitted to the vacuum chamber 50 through a vacuum ring 47 and is supplied to the flexible body of the other side through an inlet 48 of the vacuum chamber 50, which is connected to the vacuum tube 60. A shaft groove 49, to which a power transmission shaft is connected, is formed in the center of the wheel. As shown in FIG. 4C, since the single unit wheels, each of which is shown in FIG. 4B, are stacked, the semicircular grooves 46 form circular grooves 46. When the body 42 of the wheel 40 contacts the valve driver 82 of the suction mechanism, the groove 46 contacts the opening of the suction mechanism. Accordingly, air is sucked in. Here, the wheels are stacked to form three grooves 46. However, the number of grooves can be controlled to be appropriate according to the width of the endless track belt, for example, two or four or more. Also, as shown in FIG. 4C, in the entire wheel consisting of the single unit wheels, each of the single unit wheels stacked in the middle of the entire wheel is formed to have semicircular grooves on both top and bottom surfaces.

Figure 5:
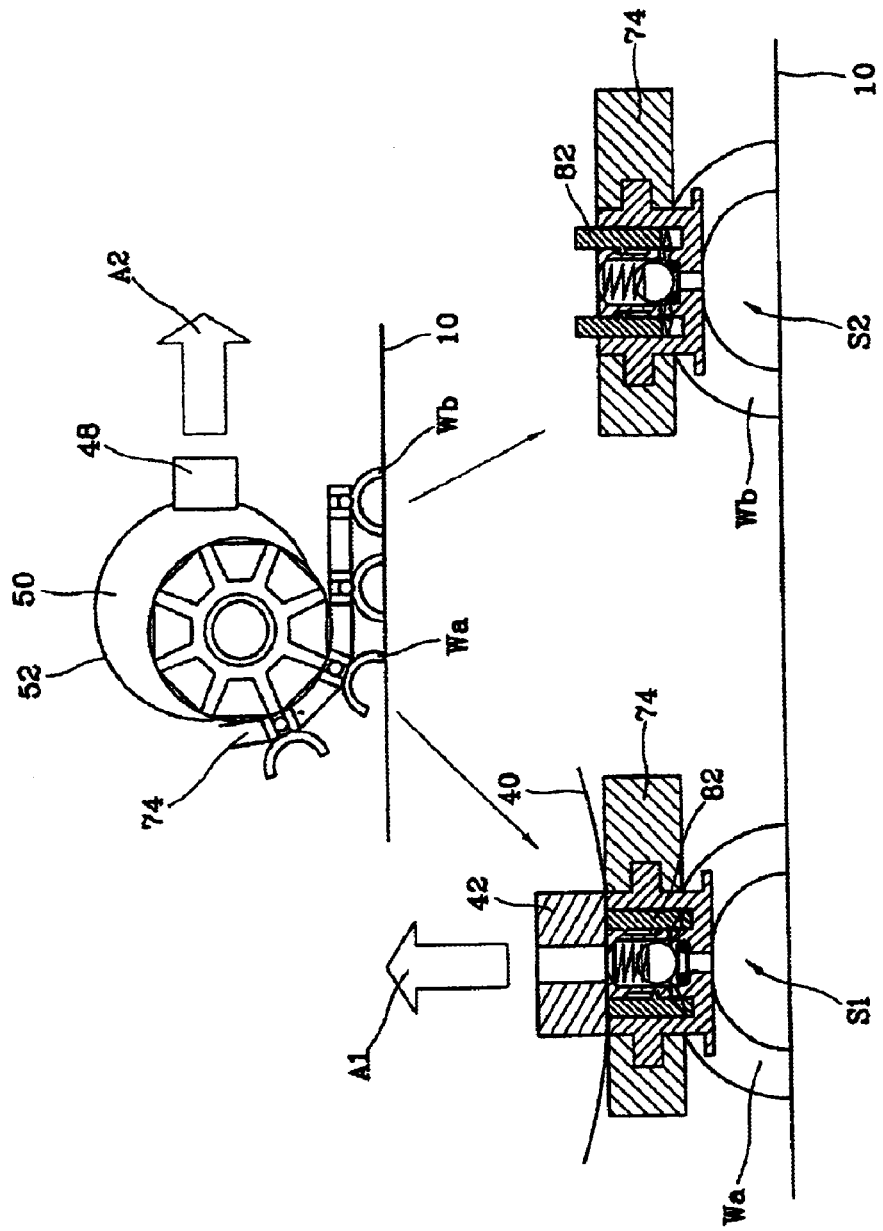
FIG. 5 illustrates a principle with which a front wheel adopted in FIG. 1 travels on an endless track belt.
Figure 6:
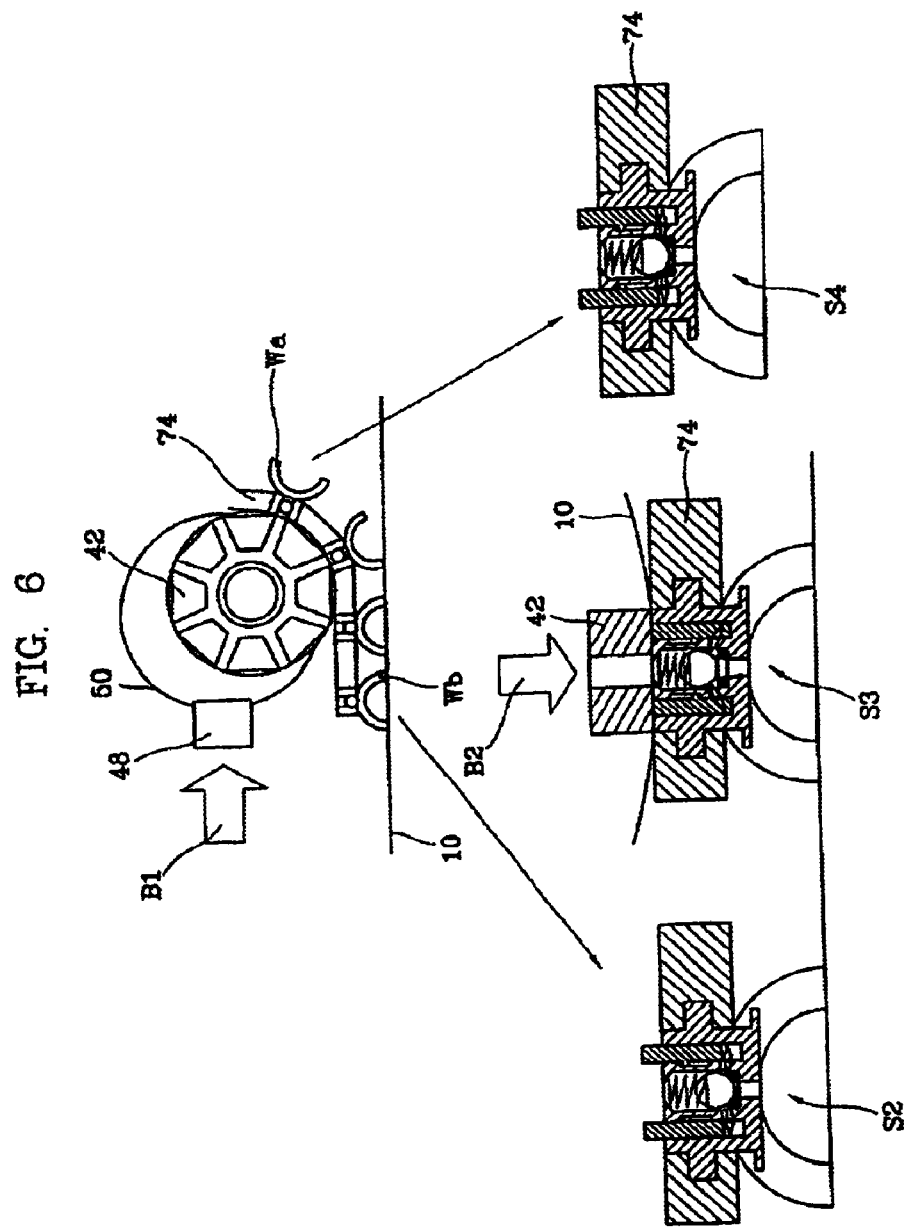
FIG. 6 illustrates a principle with which a rear wheel adopted in FIG. 1 travels on an endless track belt.
Figure 7A:
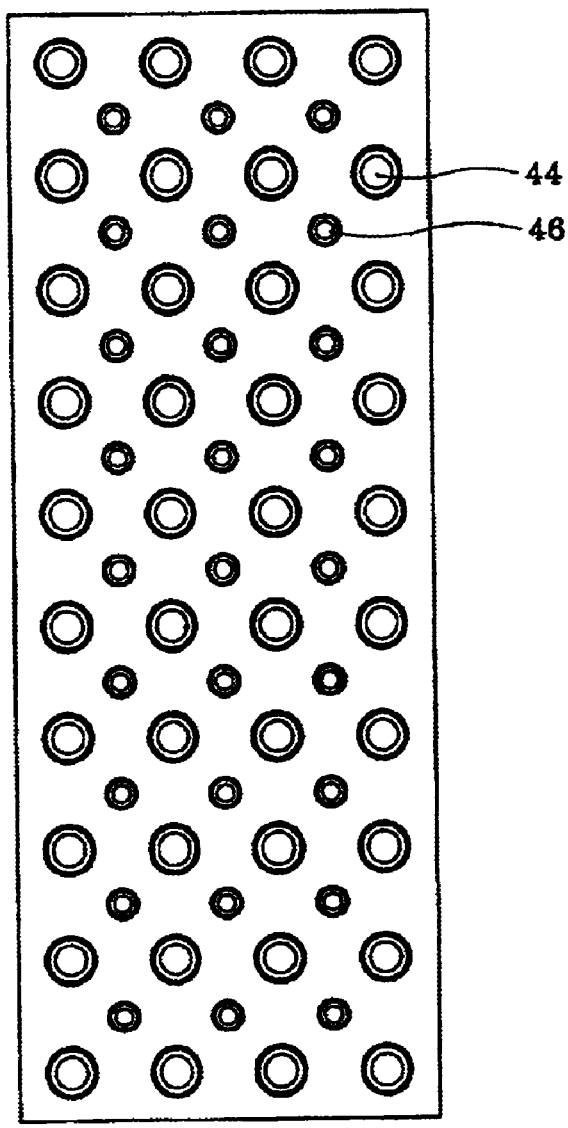
FIG. 7A is a plan view of the endless track belt shown in FIG. 1.
Figure 7B:
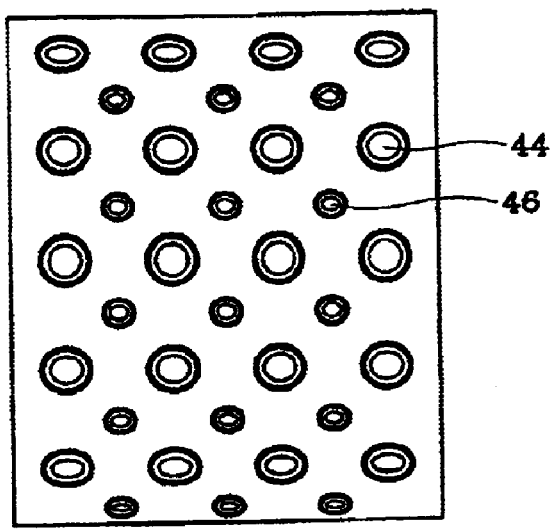
FIG. 7B is a front view of the wheel shown in FIG. 1.

The principles of how the surface traveling mobile apparatus according to the present invention travels along the endless track will now be described. FIG. 5 illustrates the principle by which a front wheel adopted in FIG. 1 travels on an endless track belt. FIG. 6 illustrates the principle by which a rear wheel adopted in FIG. 1 travels on the endless track belt. FIG. 7A is a plan view of the endless track belt shown in FIG. 1. FIG. 7B is a front view of the wheel shown in FIG. 1.

It is apparent to anyone skilled in the art that the wheels which rotate inside the endless track belt are driven by power sources, and that electric engines for which electric power sources such as commercial power supplies and batteries are used and chemical fuel engines for which fossil fuels such as gasoline and light oil are used, are used as the power sources. Therefore, a detailed description of a powering mechanism will be omitted. The surface traveling mobile apparatus and the cleaning apparatus using the same, from the stage where the wheels are driven by power, will now be described.

The wheel positioned in the front part in the traveling direction of the surface traveling mobile apparatus is referred to as a front wheel and the wheel positioned in the rear part is referred to as a rear wheel. In the wheel of FIG. 7B, when the body 42 of the front wheel 40 presses the valve driver 82 of the suction mechanism due to the rotation of the endless track belt of FIG. 7A, as shown in FIG. 5, the air is exhausted from a flexible body Wa in the direction A1, since the ball valve is opened. Accordingly, the hemispherical space of the flexible body Wa becomes vacuous S1, and thus the flexible body Wa is vacuum attached to the surface 10. The moment which the wheel passes over the valve driver 82 of the suction unit, the ball valve is closed, thus keeping the hemispherical space of the flexible body Wb vacuous S2. Accordingly, the flexible body Wb is vacuum attached to the surface 10. Here, the air sucked in from the suction mechanism to a vacuum chamber 52 is supplied to the flexible body on the opposite side through a vacuum tube in the direction A2.

As shown in FIG. 6, the rear wheel undergoes processes similar to the above, thus sequentially contacting the suction mechanisms as the endless track belt proceeds. The flexible body Wb of the suction unit which contacts the wheel is detached from the surface since the ball valve is opened, and thus air B2 supplied from the vacuum pump in the direction B1 is supplied to the hemispherical space S3 of the flexible body which was kept vacuous S2, in the direction B2. The flexible body Wa over which the wheel passed S4 is continuously kept detached from the surface.

As mentioned above, the surface traveling mobile apparatus according to the present invention can travel on a level plane, a vertical plane and a ceiling, as well as on an inclined plane, in a state of being vacuum attached to the surface by a plurality of flexible bodies formed on the bottom surface of the surface traveling mobile apparatus being repeatedly vacuum attached to and detached from the surface according to the rotation of the endless track belt and the wheels. An important point to be considered is whether the surface, on which the surface traveling mobile apparatus travels in the state of being vacuum attached thereto, can withstand the load of the surface traveling mobile apparatus, and whether the attachment force by which the surface traveling mobile apparatus is vacuum attached to the surface can carry the load of the surface traveling mobile apparatus. It depends on the capability of the vacuum pump and the attachment strength to the surface. Manufacturing a desired surface traveling mobile apparatus by designing the suction mechanism considering the weight of the surface traveling mobile apparatus is a matter of design left to those skilled in the art. Therefore, a description thereof will be omitted. Though not shown in the attached drawings, it is preferable that the surface traveling mobile apparatus be supported by an additional supporting means to further insure that the surface traveling mobile apparatus does not fall when it travels on a vertical plane or a ceiling. Since this is also a matter of design, a description thereof will be omitted.

FIG. 8 is a side view schematically showing a surface traveling mobile apparatus according to another embodiment of the present invention, in which the surface traveling mobile apparatus further includes units for controlling the tension of a belt when the surface traveling mobile apparatus of FIG. 1 travels on a rugged surface or over an obstacle. The endless track belt 74 of the surface traveling mobile apparatus according to the present invention must maintain a certain amount of tension. However, it is not easy to travel on rugged surfaces or stairs when tension is too strong. Therefore, as shown in FIG. 8, it is possible to control the tension of the endless track belt by providing a belt tension controller 100 on the endless track. The belt tension controller 100 is installed to be supported by the lower surface of the endless track belt 74, to thus move up and down, though not shown in FIG. 8. Therefore, the tension of the belt increases when the belt tension controller 100 moves up, and the tension of the belt decreases when the belt tension controller 100 moves down. Accordingly, it is possible to control the tension of the belt according to the shape of the rugged surface, in the surface traveling mobile apparatus according to the present invention. The tension of the belt is controlled by a sensing means for sensing the rugged surface, and a microcomputer (not shown) for giving commands based on sensed information on the rugged surface from the sensing means to the belt tension controller 100. Since the above is apparent to those skilled in the art, a detailed description thereof will be omitted.

Figure 9A:
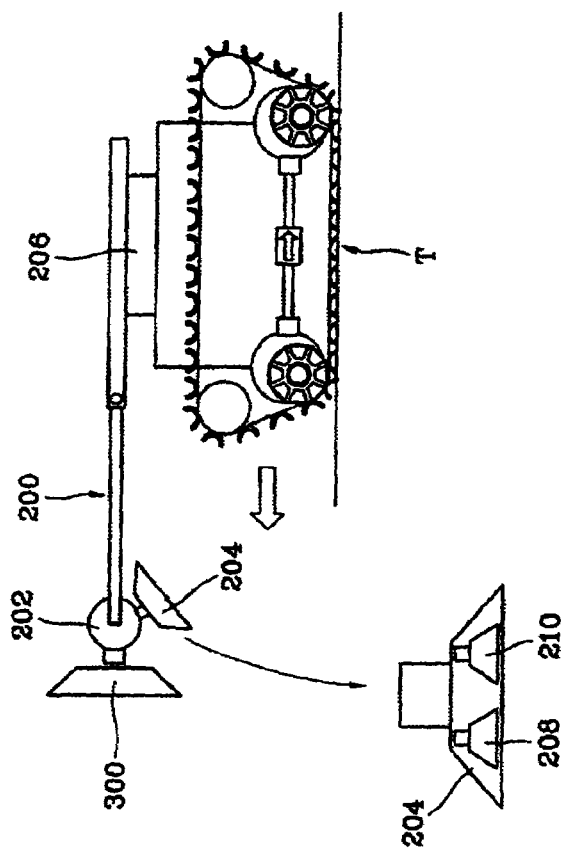
FIG. 9A is a plan view schematically showing a surface traveling mobile apparatus according to another embodiment of the present invention, in which the surface traveling mobile apparatus further includes an articulated apparatus with an extendable boom structure when the surface traveling mobile apparatus of FIG. 1 travels on a rugged surface and over an obstacle.
Figure 9B:
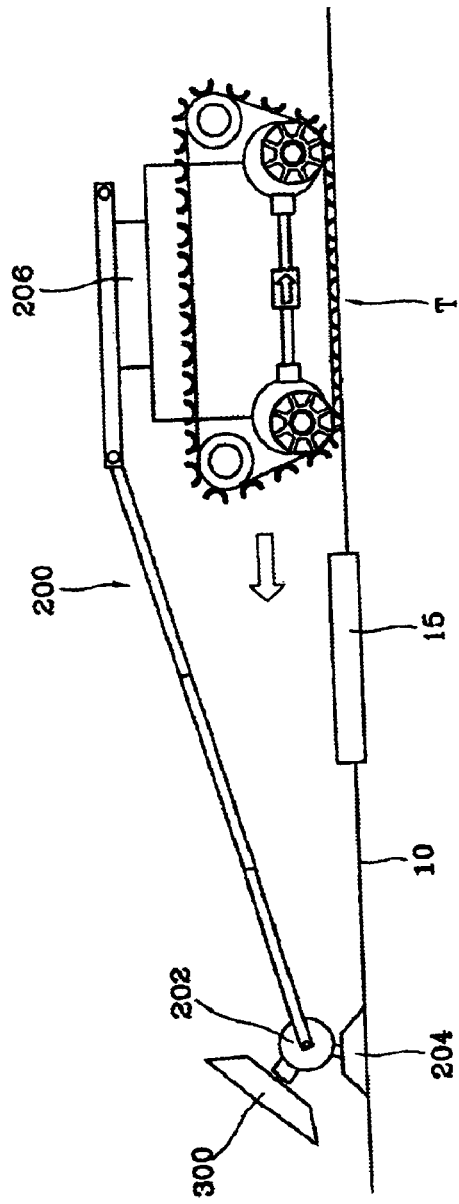
FIG. 9B is a side view showing an articulated apparatus whose length is extended.
Figure 10A:
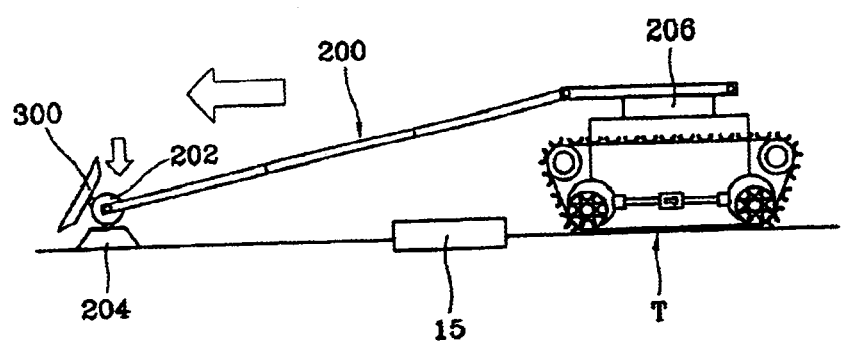
FIGS. 10A through 10D illustrate the rugged surface or obstacle traveling movements of the surface traveling mobile apparatus according to the present invention.
Figure 10B:
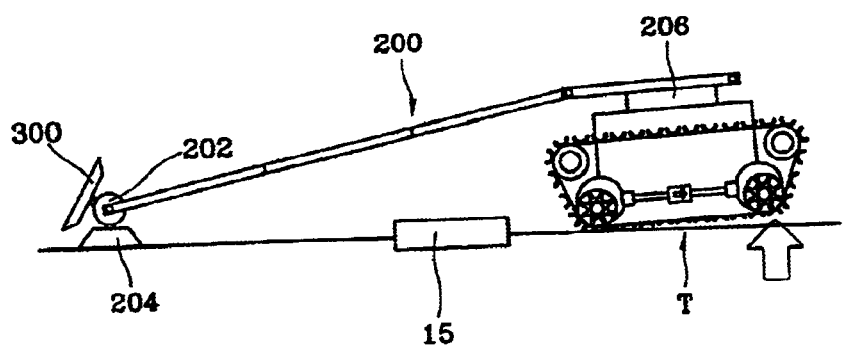
Figure 10C:
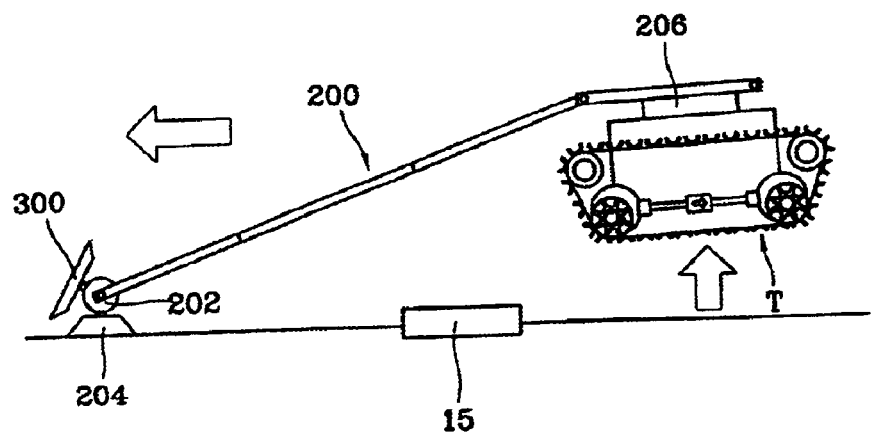
Figure 10D:
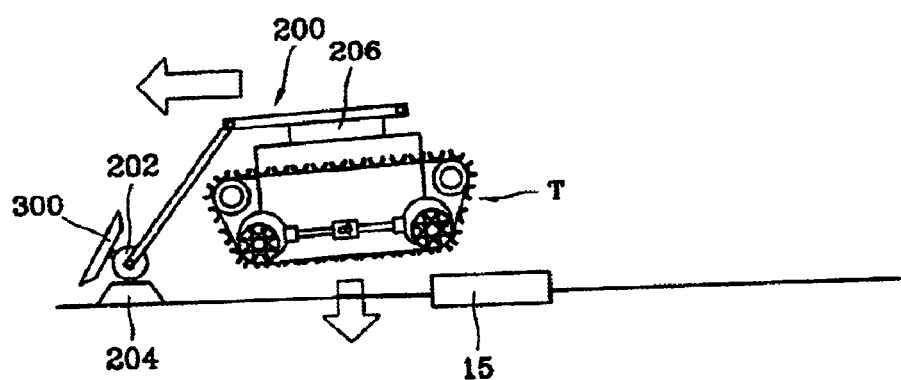

FIG. 9A is a plan view schematically showing a surface traveling mobile apparatus according to another embodiment of the present invention, in which the surface traveling mobile apparatus further includes an articulated apparatus of an extendable ladder structure when the surface traveling mobile apparatus of FIG. 1 travels on a rugged surface or over an obstacle. FIG. 9B is a plan view showing an articulated apparatus hose length is extended. FIGS. 10A through 10D illustrate the rugged surface traveling movements of the surface traveling mobile apparatus according to the present invention. As shown in FIGS. 9A, 9B, and 10A through 10D, when the surface traveling mobile apparatus according to the present invention travels over an obstacle, the means for sensing the obstacle and the microcomputer for giving commands for traveling over the obstacle are not shown, as mentioned with regard to the belt tension controller. Since it is apparent to those skilled in the art, a detailed description thereof will be omitted. When the obstacle is sensed, the surface traveling mobile apparatus according to the present invention operates an extendable articulated apparatus 200 in the traveling direction, thus extending a portion of the articulated apparatus which will be called the boom. The boom can extend telescopically. A vacuum pump motor 202 is included in the end of the boom and a flexible body 204 is suspended from the lower end of the vacuum pump motor 202. The flexible body 204 attaches to the surface. When a driver 206 of the articulated apparatus operates, the boom is extended, and attaches to the surface. The attached flexible body is vacuum attached to the surface due to the forward rotation of the vacuum pump motor 202 and is detached from the surface due to the reverse rotation of the vacuum pump motor 202, though not shown in FIGS. 9A through 10D. The flexible body 204 is an external flexible body. Internal flexible bodies 208 and 210 are included inside the flexible body 204. It is important to maintain a strong attachment so that the attachment force withstands the load of the surface traveling body when the articulated apparatus 200 retracts the boom so as to let the surface traveling mobile apparatus travel over an obstacle 15 by lifting the body of the surface traveling mobile apparatus T. A rotating brush 300 is included at the end of the boom for cleaning the surface. Though not shown in the attached drawings, the surface traveling mobile apparatus according to the present invention can operate as a cleaning apparatus when cleaning equipment is provided, and can be used as an emergency rescue machine. For example, when a spray unit for spraying water or wash liquid is loaded inside or outside the surface traveling mobile apparatus, in addition to the rotating brush 300 shown in FIG. 9A, a cleaning apparatus is realized. In this case, water and wash liquid can be supplied from a rooftop or the surface of the earth through an additional rubber or plastic tube. Here, the rotating brush and the spray unit can be automatically operated by the microcomputer when the surface traveling mobile apparatus moves.

The structure and operation of the vacuum pump (30 of FIG. 1) applied to the surface traveling mobile apparatus according to the present invention will now be described in more detail with reference to the attached drawings.

Figure 11A:
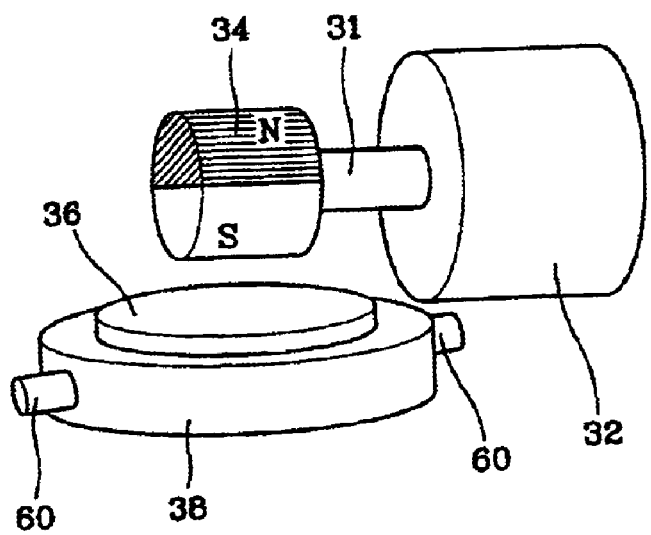
FIGS. 11A through 11C illustrate the structure and operation of a vacuum pump applied to the present invention.
Figure 11B:
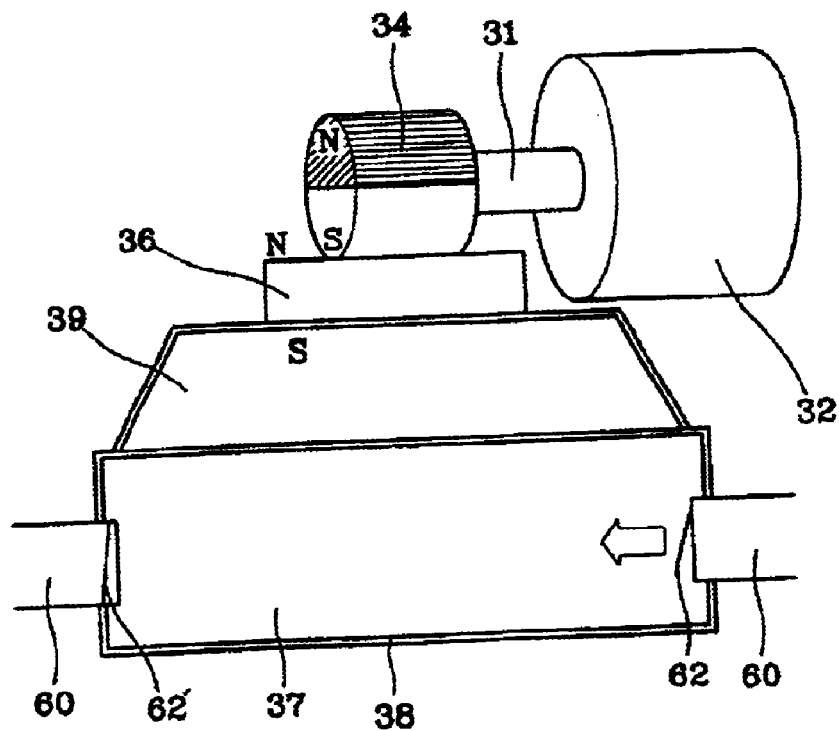
Figure 11C:
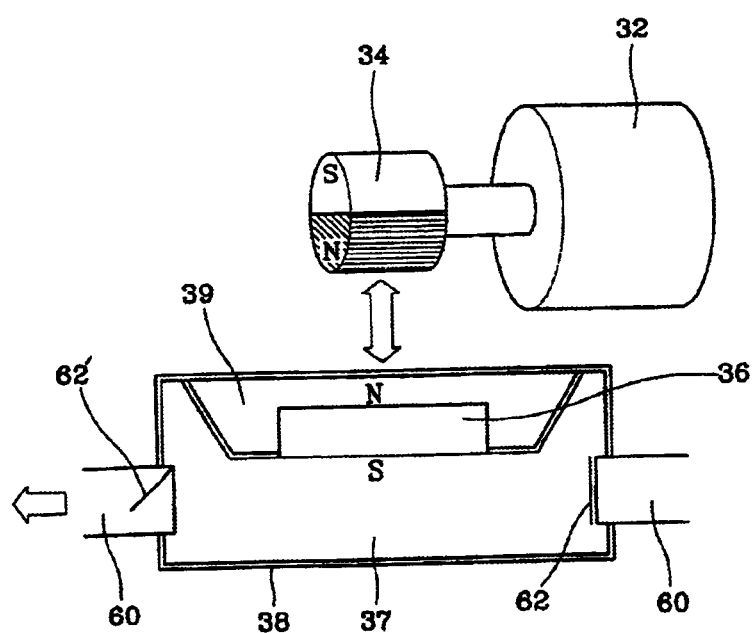

According to FIGS. 11A and 11C for illustrating the structure and operation of the vacuum pump applied to the present invention, the vacuum pump includes a motor 32 for generating a driving force, a rotating permanent magnet 34 which is connected to the motor 32 on a shaft 31 and rotates, a fixed permanent magnet 36 which is repulsed or attracted by the magnetic force of the rotating permanent magnet 34, a vacuum chamber 38 including two openings 60 for air to pass through a pump 39 having a diaphragm which goes in and out of the internal space 37 of the vacuum chamber 38 due to the repulsion and attraction of the magnet 36, directional valves 62 and 62' for passing the air in one direction by the driving of the pump 39. Accordingly, the air of the vacuum chamber 38 moves in one direction. The rotating magnet 34, in which the N pole and the S pole are alternately arranged, is cylindrical. When the rotating magnet 34 rotates, the repulsion occurs in the case where the pole of the rotating magnet 34 and the pole of the fixed magnet 36, which are next to each other, are the same, and the attraction occurs in the case where the pole of the rotating magnet 34 and the pole of the fixed magnet 36, which are next to each other, are different. When the pole of the rotating magnet 34 is the same as the pole of the fixed magnet 36, the fixed magnet 36 is pushed into the vacuum chamber 38 together with the diaphragm of the pump 39, thus compressing the volume of the vacuum chamber 38 so that the exhausting valve 62' is opened. Therefore, the air is exhausted from the vacuum chamber. When the pole of the rotating magnet 34 is different from the pole of the fixed magnet 36, the fixed magnet 36 is attracted by the rotating magnet 34. Accordingly, the pump 39 comes out of the vacuum chamber 38 and thus, the volume of the vacuum chamber 38 expands and the inlet valve 62 opens. Therefore, the air enters the vacuum chamber. In FIGS. 11A through FIG. 11C, processes where the air in the vacuum chamber is inhaled and exhausted by the repulsion and attraction of the rotating magnet and the fixed magnet are explained. However, a vacuum pump of a high performance, which is used in dental clinics, can be used.

Figure 12A:
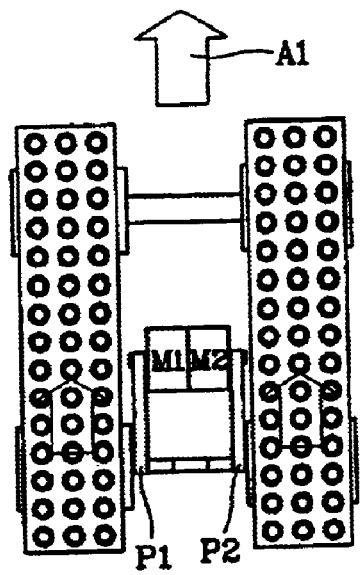
FIGS. 12A through 12D illustrate the proceeding, receding, and direction changing movements of the surface traveling mobile apparatus according to the present invention.
Figure 12B:
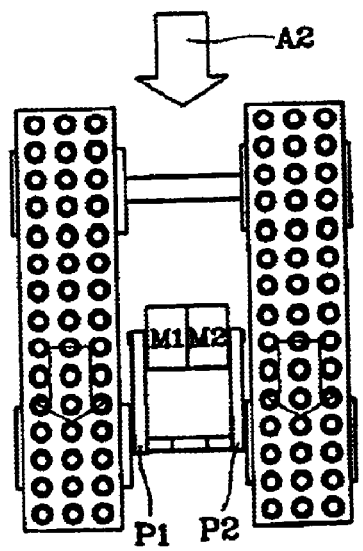
Figure 12C:
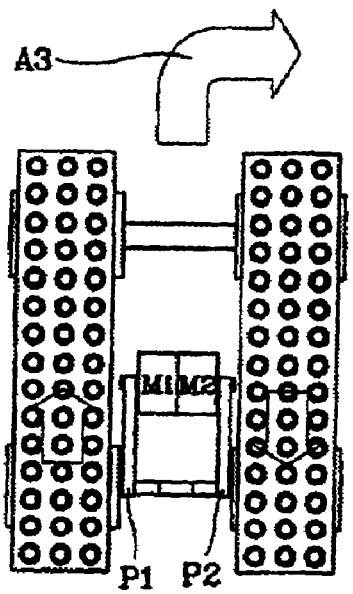
Figure 12D:
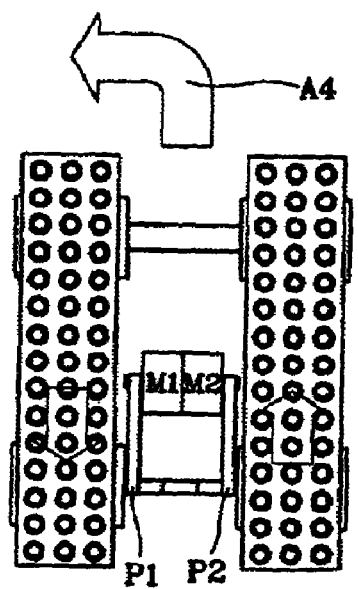

FIGS. 12A through 12D illustrate the proceeding, receding, and direction changing movements of the surface traveling mobile apparatus according to the present invention. FIGS. 12A through 12D are bottom views of the surface traveling mobile apparatus according to the present invention. A driver for transmitting power to the endless track belts is shown between the endless track belts. In the driver, motors M1 and M2 for driving the belts of the respective sides are schematically connected to pulleys P1 and P2. Accordingly, the driving force of the motors is transmitted to the belts. As shown in FIG. 12A, when the driving forces of the motors M1 and M2 are provided to the belts in the same traveling direction and with the same magnitude, the surface traveling mobile apparatus travels in the arrow direction A1. As shown in FIG. 12B, when the driving forces of the motors M1 and M2 are provided to the belts in the same receding direction and with the same magnitude, the surface traveling mobile apparatus recedes in the arrow direction A2. As shown in FIG. 12C, when the driving force of the motor M1 is larger than the driving force of the motor M2 and the direction of the driving force of the motor M1 is opposite to the direction of the driving force of the motor M2, the surface traveling mobile apparatus changes the traveling direction into the arrow direction A3 which is the rotation direction of the motor M1. As shown in FIG. 12D, when the driving force of the motor M1 is smaller than the driving force of the motor M2 and the direction of the driving force of the motor M1 is opposite to the direction of the driving force of the motor M2, the surface traveling mobile apparatus changes the traveling direction into the arrow direction A4 which is the rotation direction of the motor M2. The proceeding, receding, and direction changing methods of the surface traveling mobile apparatus according to the present invention can be realized by those skilled in the art using the same method by which common traveling mobile apparatuses proceed, recede, and change directions. Therefore, a detailed description thereof will be omitted.

Figure 13:
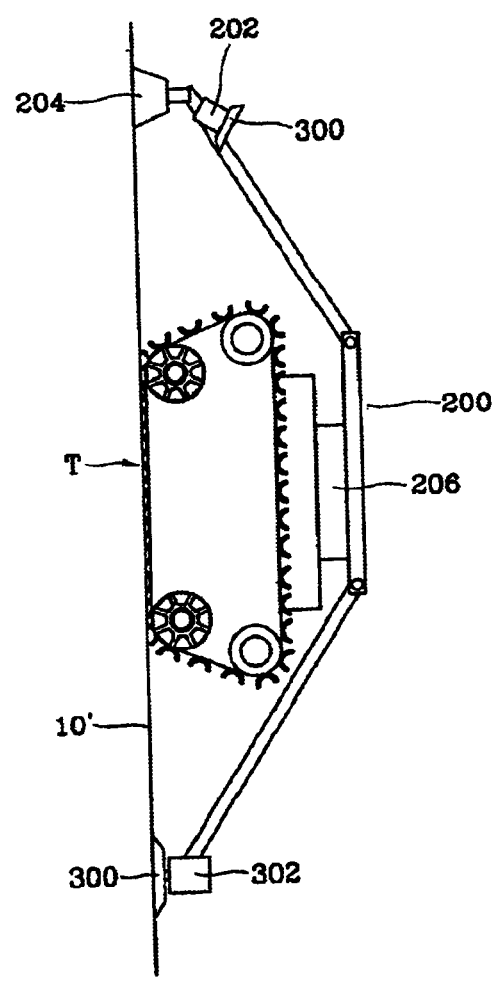
FIG. 13 schematically shows an example, in which the surface traveling mobile apparatus according to the present invention cleans a vertical window.

FIG. 13 schematically shows an example, in which the surface traveling mobile apparatus according to the present invention cleans a vertical window. As shown in FIG. 13, an example of a cleaning apparatus using the surface traveling mobile apparatus according to the present invention has a structure similar to those illustrated in FIGS. 9A through 10D. It is schematically shown that the cleaning apparatus cleans the surface, while climbing a window or a marble wall 10'. The spray unit for spraying water and the wash liquid is not shown in FIG. 13 for the convenience of explanation. As shown in FIG. 13, the cleaning apparatus according to the present invention adopts a structure advantageous to traveling on vertical walls and over obstacles, in which the bottom surface of the surface traveling mobile apparatus is vacuum attached to the vertical wall and the surface traveling mobile apparatus moves by the constriction and expansion of the boom. A driver 302 for driving the rotating brush 300 for cleaning the surface can be further included. The articulated apparatus 200 adopted in the cleaning apparatus is driven by the driver 206 and preferably includes various sensors for sensing obstacles and determining dirty and clean areas. Since it is apparent to those skilled in the art that various methods of realizing the operation of the cleaning apparatus exist, description of detailed embodiments thereof will be omitted and the concept thereof will be briefly explained. For example, a device for supplying and spraying water and the cleaning solution can be included inside or outside the cleaning apparatus.

In order to operate the cleaning apparatus according to the present invention, the wall or the window must be designed to withstand the load of the cleaning apparatus. However, the load of the cleaning apparatus can be various according to design. When a sensing code such as a transparent bar code for displaying limit load is engraved on the wall or the to window and a sensor for sensing the code is included in the cleaning apparatus, it is possible to determine whether the cleaning apparatus can clean the surface in a state where the surface withstands the load of the cleaning apparatus. This will be briefly described with reference to FIGS. 14A and 14B which are a plan view and a side view, respectively, of a is window to which a transparent bar code, which transmits visible light and totally reflects certain infrared wavelengths, is attached.

Figure 14A:
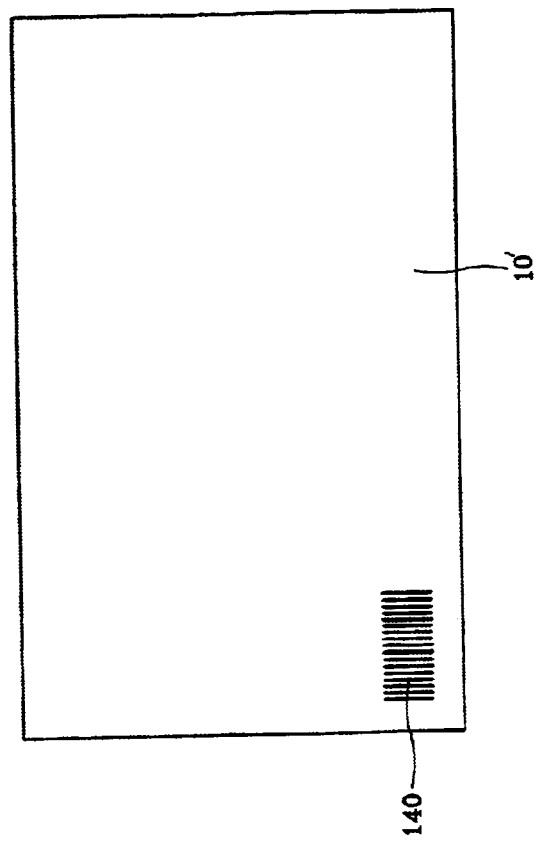
FIGS. 14A and 14B are a plan view and a side view, respectively, of a window to which a transparent bar code, which transmits a visible ray and totally reflects certain wavelengths in the infrared region, is attached.
Figure 14B:
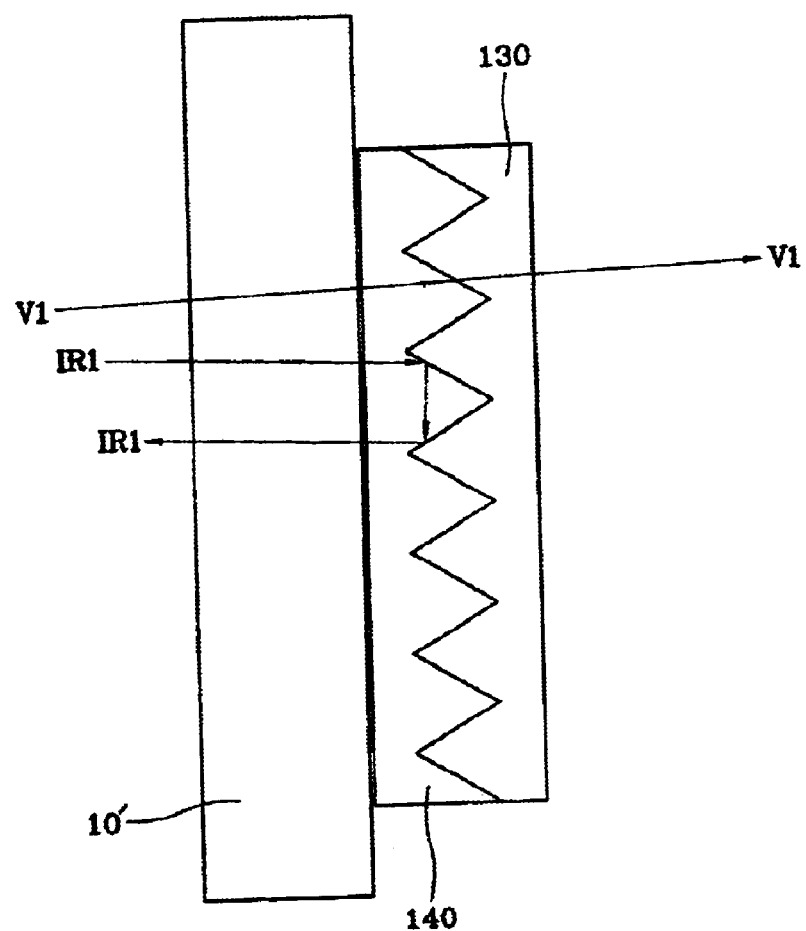

As shown in FIG. 14A, a load limit displaying transparent bar code 140 is engraved in part of the surface 10. As shown in FIG. 14B, an invisible bar code 140 is printed on the side of the surface 10 and infrared rays 130 of 940 through 1500 nm are incident on the bar code 140. Accordingly, a visible ray V1 is transmitted and infrared rays IR1 of 940 through 1500 nm are retro-reflected.

Figure 15:
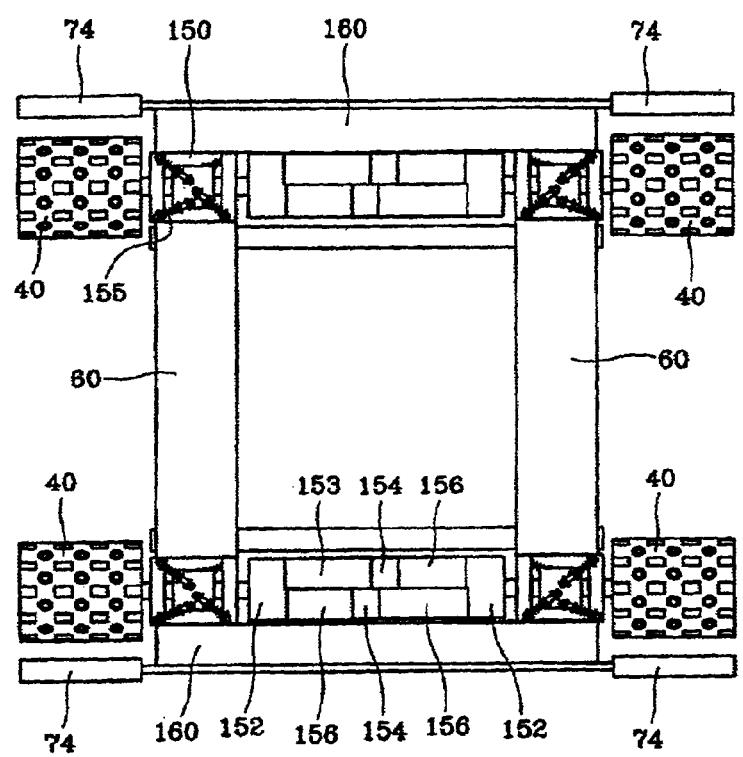
FIG. 15 is a view of the underside of a traveling mobile apparatus according to the present invention, from which an endless track belt is omitted.

FIG. 15 is a view of the underside of the traveling mobile apparatus according to the present invention, from which an endless track belt is omitted. As shown in FIG. 15, the surface traveling mobile apparatus according to the present invention is preferably symmetrical like a military tank and caterpillar equipment for construction work. In general, shock absorbers (a shock preventing unit) for preventing shocks in the gravitational direction are adopted in most traveling mobile apparatuses. However, in the case of the traveling mobile apparatus which travels against gravity according to the present invention, since the traveling mobile apparatus may not smoothly travel on a surface when shocks are inflicted from left and right or up and down directions with respect to gravity, it is possible to prevent shocks by providing shock absorber structures 150 to a structure for connecting the wheels 40 on both ends of a traveling mobile apparatus frame 160 to each other. The shock absorber structure 150 is a three-dimensional suspension structure, which has a hub gear in the center and in which three shock absorbers are placed on each of the upper and lower ends of a circular plate or a square plate, fixed to the outer perimeter. Gears 152, reversible motors 154 for generating power and transmitting the generated power to the gears, single-directional gears 156 connected to the reversible motors, and vacuum pumps 156 for making the surface traveling mobile apparatus vacuous are included between the three-dimensional suspension structures so that the air flows from the front wheel to the rear wheel or from the rear wheel to the front wheel. The installation position of the vacuum pump 156 is different from the installation position of the vacuum pump 30. However, flow of the air occurs in one direction between the front wheel and the rear wheel depending on whether the surface traveling mobile apparatus proceeds or recedes. Though not shown, the air flows between the vacuum tube 60 and the vacuum pump 156. Accordingly, the same load is exerted on the body of the surface traveling mobile apparatus and caterpillar type wheels at any angle and position.

INDUSTRIAL APPLICABILITY

As mentioned above, the surface traveling mobile apparatus according to the present invention and the cleaning apparatus using the same can smoothly travel on a flat plane, an inclined plane, a vertical wall, and a ceiling, and can clean the windows of high buildings automatically.

What is claimed is:

1. A surface traveling mobile apparatus which moves by an endless track belt trained around a case thereby traveling on a surface by rotation of wheels driven by a power source, the surface traveling mobile apparatus comprising:
    vacuum chambers installed to be attached to sides of the wheels;
    a vacuum tube connecting the vacuum chambers to each other;
    a vacuum pump formed in a part of the vacuum tube for intaking and exhausting air, and suction mechanisms installed along the endless track belt at predetermined intervals, valve driven by contacting the wheels, and vacuum attached to the surface by the vacuum pump intaking and exhausting air
    wherein the vacuum pump comprises:
    a motor for generating a rotary force;
    a rotating magnet, in which the N pole and the S pole are alternately arranged and which is rotated by the rotary force of the motor, the rotating magnet being adapted to generate a varying magnetic field;

a fixed magnet arranged to be opposite to the rotating magnet;

a pump having a diaphragm operating by attraction and repulsion forces between the rotating magnet and the fixed magnet;

a vacuum pump chamber, from which air is pumped outside due to movement of the diaphragm; and directional valves installed in openings at both ends of the vacuum pump chamber for permitting the pumped air to flow in only one direction.

2. A surface traveling mobile apparatus which moves by an endless track belt trained around a case thereby traveling on a surface by rotation of wheels driven by a power source, the surface traveling mobile apparatus comprising:

vacuum chambers installed to be attached to sides of the wheels;

a vacuum tube connecting the vacuum chambers to each other;

a vacuum pump formed in a part of the vacuum tube for intaking and exhausting air; and suction mechanisms installed along the endless track belt at predetermined intervals, valve driven by contacting the wheels, and vacuum attached to the surface by the vacuum pump intaking and exhausting air;

wherein each of the suction mechanisms comprises:

a hollow valve case formed to be integrated with the endless track belt;

a valve driver formed on apart of the valve case and coming in and going out from the valve case by contacting the wheels;

a lever operated by the valve driver coming in and going out from the valve case;

a ball moving up and down in the hollow portion of the valve case by operation of the lever;

a spring for providing an elastic bias, said spring being installed to contact an upper portion of the ball in the hollow portion of the valve case; and a flexible body formed to be integrated with a lower portion of the valve case and vacuum attached to or detached from the surface when air is evacuated from or supplied into a space between the surface and said flexible body through a lower O ring opening of the valve case due to movement of the ball.

3. The surface traveling mobile apparatus of claim 2, wherein each of the suction mechanisms further comprises a separation preventing groove so that the valve driver in the valve case is not separated from the valve case.

4. A surface traveling mobile apparatus which moves by an endless track belt trained around a case thereby traveling on a surface by rotation of wheels driven by a power source, the surface traveling mobile apparatus comprising:

vacuum chambers installed to be attached to sides of the wheels;

a vacuum tube connecting the vacuum chambers to each other;

a vacuum pump formed in a part of the vacuum tube for intaking and exhausting air;

suction mechanisms installed along the endless track belt at predetermined intervals, valve driven by contacting the wheels, and vacuum attached to the surface by the vacuum pump intaking and exhausting air; and an articulated apparatus having a boom, which is telescopically extendable and retractable, and a further suction mechanism being vacuum attachable to and detachable from the surface, wherein the further suction mechanism is formed at the end of the boom so that the surface traveling mobile apparatus safely travels on a rugged surface or over an obstacle.

5. The surface traveling mobile apparatus of claim 1, further comprising a belt tension controlling apparatus for controlling the tension of the endless track belt so that the surface traveling mobile apparatus safely travels on a rugged surface or over an obstacle.

6. The surface traveling mobile apparatus of claim 1, wherein each of the wheels comprises:

grooves for preventing the wheel from being separated from the endless track belt when the wheel contacts the endless track belt; and an opening for letting air flow between the wheel and the suction mechanism to the vacuum chamber.

7. A cleaning apparatus for automatically cleaning a surface by being moved by a surface traveling mobile apparatus which moves by an endless track belt trained around a case thereby traveling on the surface by rotation of wheels driven by a power source, the cleaning apparatus comprising:

vacuum chambers installed to be attached and sealed to the wheels;

a vacuum tube connecting the vacuum chambers to each other;

a vacuum pump formed in a part of the vacuum tube for pumping air;

suction mechanisms installed along the endless track belt at predetermined intervals, valve driven by contacting the wheels, and vacuum attached to the surface by operation of the vacuum pump;

a spraying device for spraying water or a wash liquid on the surface when the surface traveling mobile apparatus moves; and a rotating brush for washing the surface using the sprayed water or liquid;

wherein the vacuum pump comprises:

a motor for generating a rotary force;

a rotating magnet, in which the N pole and the S pole are alternately arranged and which is rotated by the rotary force of the motor, the rotating magnet being adapted to generate a varying magnetic field;

a fixed magnet arranged to be opposite to the rotating magnet;

a pump having a diaphragm operating by attraction and repulsion forces between the rotating magnet and the fixed magnet;

a vacuum pump chamber, from which air is pumped outside due to movement of the diaphragm; and directional valves installed in openings at both ends of the vacuum pump chamber for permitting the pumped air to flow in only one direction.

8. The cleaning apparatus of claim 7, wherein each of the suction mechanisms comprises:

a hollow valve case formed to be integrated with the endless track belt;

a valve driver coming in and going out from at least a part of the valve case by contacting the wheels;

a lever operated by the valve driver coming in and going out from the valve case;

a ball moving up and down in the hollow portion of the valve case by operation of the lever;

a spring for providing an elastic bias, said spring being installed to contact an upper portion of the ball in the hollow portion; and a flexible body formed to be integrated with a lower portion of the valve case and vacuum attached to or detached from the surface when air is evacuated from or supplied into a space between the surface and said flexible body through a lower O ring opening of the valve case due to movement of the ball.

9. The cleaning apparatus of claim 8, wherein each of the suction mechanisms further comprises a separation preventing groove so that the valve driver in the valve case is not separated from the valve case.

10. The cleaning apparatus of claim 7, further comprising an articulated apparatus having
   a boom, which is telescopically extendable and retractable, and
   a further suction mechanism being vacuum attachable to and detachable from the surface, wherein the further suction mechanism is formed at the end of the boom so that the surface traveling mobile apparatus safely travels on a rugged surface or over an obstacle.

11. The cleaning apparatus of claim 7, further comprising a belt tension controlling apparatus for controlling the tension of the endless track belt so that the surface traveling mobile apparatus safely travels on a rugged surface or over an obstacle.

12. The cleaning apparatus of claim 7, wherein each of the wheels comprises:
   grooves for preventing the wheel from being separated from the endless track belt when the wheel contacts the endless track belt; and
   an opening for letting air flow between the wheel and the suction mechanism to the vacuum chamber.

13. The cleaning apparatus of claim 7, further comprising a sensing apparatus for sensing a load limit display bar code printed on the surface.

14. The surface traveling mobile apparatus of claim 1, wherein each of the suction mechanisms comprises:
   a hollow valve case formed to be integrated with the endless track belt;
   a valve driver formed on a part of the valve case and coming in and going out from the valve case by contacting the wheels;
   a lever operated by the valve driver coming in and going out from the valve case;
   a ball moving up and down in the hollow portion of the valve case by operation of the lever;
   a spring for providing an elastic bias, said spring being installed to contact an upper portion of the ball in the hollow portion of the valve case; and
   a flexible body formed to be integrated with a lower portion of the valve case and vacuum attached to or detached from the surface when air is evacuated from or supplied into a space between the surface and said flexible body through a lower O ring opening of the valve case due to movement of the ball.

15. The surface traveling mobile apparatus of claim 1, further comprising an articulated apparatus having
   a boom, which is telescopically extendable and retractable, and
   a further suction mechanism being vacuum attachable to and detachable from the surface, wherein the further suction mechanism is formed at the end of the boom so that the surface traveling mobile apparatus safely travels on a rugged surface or over an obstacle.

* * * * *